United States Patent [19]

Vines et al.

[11] 4,451,275
[45] May 29, 1984

[54] NITROGEN REJECTION FROM NATURAL GAS WITH CO2 AND VARIABLE N2 CONTENT

[75] Inventors: Harvey L. Vines, Emmaus, Pa.; Vincent Marano, Macungie, Pa.

[73] Assignee: Air Products and Chemicals, Inc., Allentown, Pa.

[21] Appl. No.: 382,738

[22] Filed: May 27, 1982

[51] Int. Cl.³ .............................................. F25J 34/02
[52] U.S. Cl. ........................................ 62/28; 62/30; 62/31; 62/33; 62/34; 62/39; 62/43
[58] Field of Search ................... 62/9, 11, 23, 24, 25, 62/26, 27, 28, 29, 30, 32, 33, 34, 38, 39, 42, 43, 44

[56] References Cited

U.S. PATENT DOCUMENTS

| | | | |
|---|---|---|---|
| 2,765,637 | 10/1956 | Etienne | 62/39 |
| 3,318,103 | 5/1967 | Jakob | 62/13 |
| 3,359,743 | 12/1967 | Di Napoli | 62/28 |
| 3,683,634 | 8/1972 | Streich | 62/29 |
| 3,983,711 | 10/1976 | Solomon | 62/28 |
| 4,149,864 | 4/1979 | Eakman et al. | 62/11 |
| 4,152,129 | 5/1979 | Trentham et al. | 62/18 |
| 4,158,556 | 6/1979 | Yearout | 62/28 |

FOREIGN PATENT DOCUMENTS 165545  9/1969  Netherlands .

OTHER PUBLICATIONS

"Nitrogen Removal", Hydrogen Processing, Apr. 1982, p. 107.
G. C. Schianni, "Cryogenic Removal of Carbon Dioxide From Natural Gas," Natural Gas Processing and Utilization Conference, Institute of Chemical Engineering, Conference #44, 1976.

Primary Examiner—Frank Sever

[57] ABSTRACT

A process is described which uses a modified double distillation cycle for rejecting nitrogen from a natural gas stream containing varying amounts of nitrogen, methane, carbon dioxide and ethane-plus hydrocarbons. The natural gas stream is fractionally distilled in the high pressure distillation stage of the double distillation cycle to provide a nitrogen overhead and a bottoms comprising carbon dioxide and ethane-plus hydrocarbons. A sidestream consisting essentially of nitrogen and methane is withdrawn from the high pressure distillation stage as intermediate level feed to the low pressure distillation stage of the double distillation cycle. The nitrogen overhead from the high pressure stage is cooled by heat exchange with the methane bottoms of the low pressure stage which methane bottoms acquires an extra degree of refrigeration from a methane heat pump cycle to provide extra nitrogen reflux to thoroughly remove the carbon dioxide from the natural gas stream in the high pressure stage.

17 Claims, 1 Drawing Figure

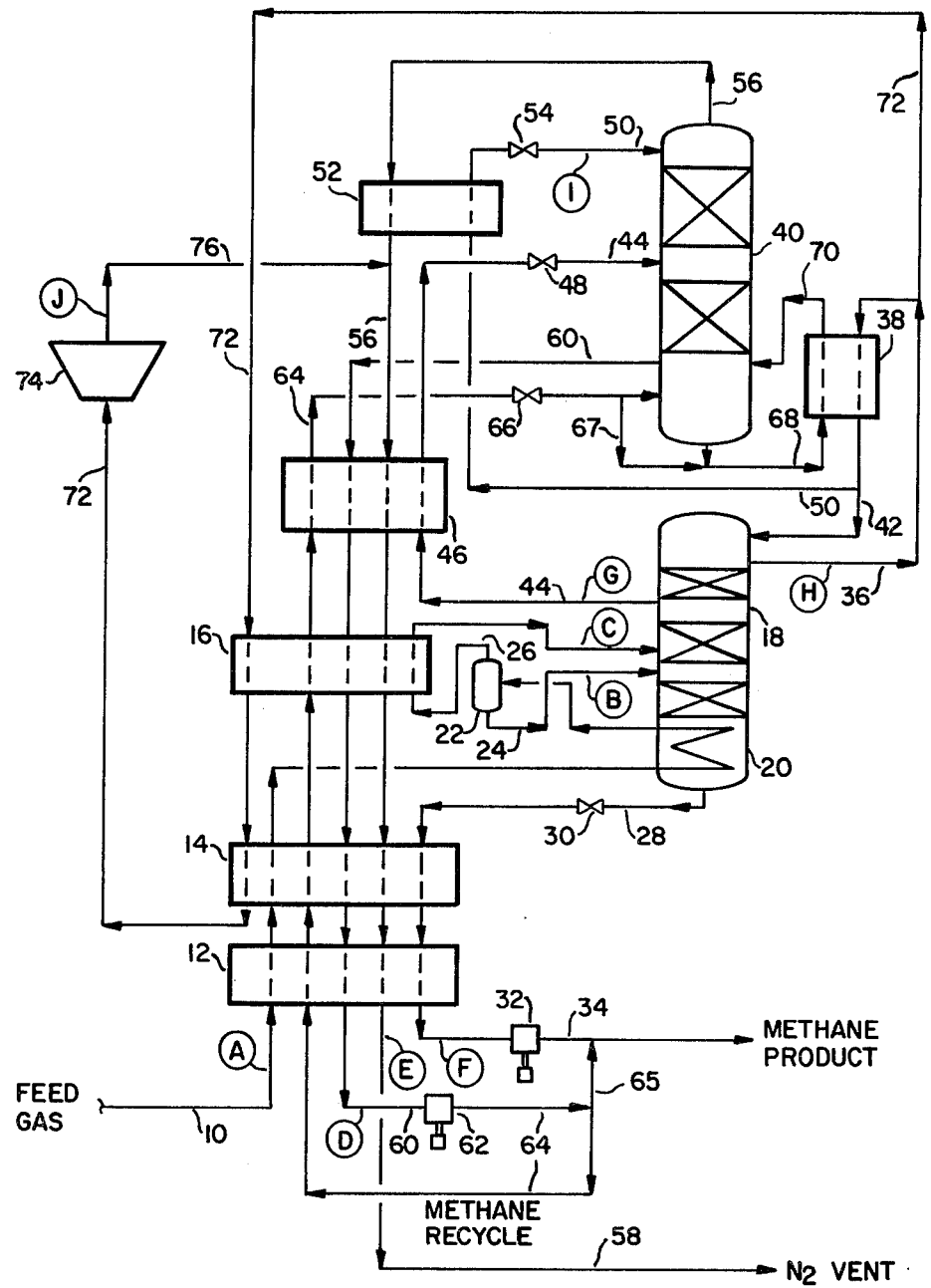

NITROGEN REJECTION FROM NATURAL GAS WITH CO₂ AND VARIABLE N₂ CONTENT

TECHNICAL FIELD

This invention relates to a process for providing a stream of substantially pure methane from a natural gas containing methane, ethane-plus hydrocarbons, nitrogen and carbon dioxide.

BACKGROUND OF THE INVENTION

Previously, nitrogen rejection from natural gas was confined to a naturally occurring nitrogen content, thus an essentially constant feed composition. Recent methods of tertiary oil recovery utilizing nitrogen injection/rejection concepts, however, necessitate nitrogen rejection units (NRU) that can process a feed gas stream of a widely varying composition because the associated gas from the well becomes diluted by increasing amounts of nitrogen as the project continues. In order to sell this gas, nitrogen must be removed since it reduces the gas heating value. In addition, many existing natural gas liquids (NGL) plants are not designed to process a feed with high nitrogen content.

Double column distillation comprising a high pressure distillation stage and a low pressure distillation stage has been used for processing fixed content natural gas and is an efficient means of accomplishing the separation of nitrogen from the methane product. A double column process uses the energy contained in the nitrogen fraction of the inlet gas to perform the work of separation. See M. Streich, "Nitrogen Removal from Natural Gas," 12th Int. Congress of Refrig, Madrid, 233–240 (1967).

However, carbon dioxide contamination in the gas stream presents an additional problem for nitrogen rejection processes. Carbon dioxide may freeze at the cryogenic temperatures in the coldest parts of the conventional double column plant causing blockage of flow and fouling of heat transfer surfaces. In the past, carbon dioxide has been removed from natural gas, usually ahead of the cryogenic nitrogen rejection unit, in order to avoid this freeze-out at very low temperatures. The carbon dioxide removal was accomplished typically by absorption in monoethanolamine or diethanolamine separately or in combination with adsorption on molecular sieves. Such carbon dioxide removal schemes are, however, subject to upsets which lead to freeze-out problems and are not energy efficient.

It is known from temperature-solubility data that carbon dioxide is decreasingly soluble in hydrocarbons at lower cryogenic temperatures and pressures. It is also known that increasingly colder temperatures are required to effect the nitrogen/methane separation in a nitrogen rejection scheme as the nitrogen content of the natural gas stream increases. Consequently, less and less carbon dioxide can be tolerated in the nitrogen and methane containing feed gas stream to the nitrogen rejection unit as the nitrogen content rises if freeze-out is to be avoided.

U.S. Pat. No. 3,683,634 discloses a process for fractionating a gas containing carbon dioxide in a fractionation zone having a high pressure stage and a low pressure stage. A portion of the pressurized gas mixture is first separated into a fraction substantially free of carbon dioxide and a fraction enriched in carbon dioxide. The remaining portion of the gas feed and the two fractions are fed into the high pressure stage at different levels.

U.S. Pat. No. 3,983,711 describes a process for recovering a nitrogen-methane mixture from natural gas containing methane, nitrogen, carbon dioxide and ethane-plus materials. In a first distillation tower, the natural gas stream is separated into a bottoms containing ethane-plus and substantially no carbon dioxide, an overhead consisting of nitrogen and methane with substantially no carbon dioxide, and a side stream containing methane, carbon dioxide and ethane-plus materials. The side stream is passed into a second distillation tower which produces an overhead containing the carbon dioxide and the remaining methane, and a bottoms which is ethane-plus products.

U.S. Pat. No. 4,158,556 discloses a process for separating nitrogen from natural gas over a wide range of nitrogen concentrations. Carbon dioxide in the raw feed gas is recovered by employing the so-called Rectisol process, employing a refrigerated methanol system in combination with the low temperature rectification process of the patent.

Dutch Pat. No. 165,545 discloses a method for separating a gas mixture containing volatile and less volatile components and containing carbon dioxide and/or water as undesirable components by cooling the gas mixture to a moderate temperature, washing the cooled gas mixture in a washing phase with a liquid fraction which is obtained as a product fraction in a later separation phase, in which washing phase a washed gas depleted of undesired components is obtained as the top product, and as the bottom product, a liquid enriched in the undesired components. The process can be used for separating nitrogen from natural gas in which case the feed gas is countercurrently washed in a wash column with a liquid methane fraction originating from the nitrogen-methane distillation column. The bottoms of the wash column comprises liquid methane enriched in carbon dioxide and the overhead comprises purified gaseous methane containing nitrogen. FIG. 4 of this patent shows a carbon dioxide wash column in combination with a double distillation column for separating nitrogen from methane.

G. C. Schianni, "Cryogenic Removal of Carbon Dioxide from Natural Gas," *Natural Gas Processing and Utilization Conference*, Institute of Chemical Engineering, Conference #44, 1976, shows the use of a second low pressure column to further purify the methane overhead from a first high pressure column. The bottom stream which is enriched in carbon dioxide is pumped back to the overhead of the first column. The high purity methane product contains up to 50 ppm carbon dioxide.

Representative of other prior art methods for removing carbon dioxide from natural gas are U.S. Pat. Nos. 3,318,103; 3,359,743; 4,149,864 and 4,152,129.

SUMMARY OF THE INVENTION

The invention provides a nitrogen rejection scheme that can accommodate widely varying gas feed compositions, particularly wide ranges in nitrogen content. The invention relates to a process for recovering a methane product stream from natural gas containing variable amounts of methane, nitrogen, carbon dioxide and ethane-plus materials. The present invention which is a modification to the conventional double column cycle allows the cycle to handle higher levels of carbon dioxide without solid formation. The carbon dioxide is kept from entering the low pressure column where freeze-out would occur by extra refluxing of the high pressure column. The extra refluxing is generated by recycle of methane product into the cryogenic process.

In its broadest aspect, the natural gas is introduced into a double distillation column comprising a high pressure distillation stage and a low pressure distillation stage where the gas is fractionally distilled to provide a waste nitrogen overhead stream and a methane bottoms product stream from the low pressure stage. The invention uses a methane cycle to condense a nitrogen overhead stream from the high pressure distillation stage in order to produce extra nitrogen reflux to the high pressure distillation stage. This extra reflux more completely washes the carbon dioxide out of the feed gas stream in the high pressure distillation stage permitting a stream comprising nitrogen, methane and substantially no carbon dioxide to be withdrawn from an intermediate level of the high pressure stage for introduction into the low pressure stage. The carbon dioxide is removed in the hydrocarbons bottoms stream from the high pressure stage which stream consists of the ethane-plus fraction and a portion of the methane contained in the feed, thus eliminating freeze-out of carbon dioxide in the low pressure stage.

More particularly, the methane cycle comprises
(a) removing a vapor methane stream from the bottoms of the low pressure stage and warming it to ambient temperature,
(b) compressing the vapor methane stream and condensing at least a portion of the compressed methane stream against the waste nitrogen overhead stream,
(c) expanding the condensed methane stream through a valve and combining it with the methane bottoms of the low pressure stage to provide additional refrigeration to the methane bottoms,
(d) withdrawing a liquid methane stream from the bottoms of the low pressure stage, and
(e) vaporizing the liquid methane stream against the nitrogen overhead of the high pressure stage to condense at least a portion of the nitrogen overhead to provide nitrogen reflux to the high pressure stage and methane reboil to the low pressure stage.

Thus the methane cycle provides the requisite refrigeration (extra refluxing) which is necessary for the effective physical, liquid washdown (scrubbing) of the carbon dioxide from the natural gas feed stream.

It is preferred that the bottoms of the high pressure distillation stage be reboiled to substantially reduce its nitrogen content. Advantageously, the natural gas feed stream, by means of a heat exchange relationship with the bottoms, provides the reboil.

When the nitrogen content of the natural gas feed stream attains a level of about 45%, a portion of the nitrogen overhead from the high pressure distillation stage is mechanically expanded and combined with the waste nitrogen overhead stream from the low pressure distillation stage in order to accommodate the increasing nitrogen concentration and to provide additional refrigeration. It is preferred that a portion of the nitrogen overhead from the high pressure distillation stage be mechanically expanded when the nitrogen content of the natural gas feed stream is 30% or greater.

The instant invention for treating a natural gas stream containing variable amounts of methane, nitrogen, carbon dioxide and ethane-plus hydrocarbons has a number of advantages:

The nitrogen rejection scheme has the capability of processing widely varying natural gas feed compositions which are from about 5 to about 80% nitrogen without experiencing upsets and freeze-out problems while being energy efficient. By using different operational modes, described below in detail, the same scheme can treat natural gas streams having variable concentrations of gaseous components while maintaining a very high hydrocarbon recovery on the order of about 99%.

Refrigeration is provided by a methane heat pump cycle which furnishes the necessary extra refluxing for the high pressure distillation stage and allows efficient operation of the nitrogen rejection unit over a range of compositions.

According to the invention, substantially all the carbon dioxide is removed from the feed gas stream in the high pressure distillation stage and is kept soluble in the liquid methane and ethane-plus bottoms until it is warmed beyond the freezing point. Carbon dioxide does not advance to the low pressure distillation stage of the double distillation column where colder temperatures are utilized for separating the nitrogen and methane.

Conventional double distillation columns can process a natural gas stream containing up to about only 100 ppm carbon dioxide at a 5% nitrogen level and up to about only 10 ppm carbon dioxide at an 80% nitrogen level before freeze-out problems occur. Generally, the process of this invention, which incorporates a methane cycle to provide extra nitrogen reflux to remove carbon dioxide from the feed stream in the high pressure distillation stage, can handle a feed stream with up to about 1% carbon dioxide at 5% nitrogen and about 500 ppm carbon dioxide at 80% nitrogen before encountering freezing problems. Costly warm equipment necessary to remove carbon dioxide to the 10 ppm level as in conventional nitrogen rejection schemes is eliminated by the process of this invention.

In addition, the high pressure distillation stage produces a bottoms product with substantially complete ethane-plus recovery and a low nitrogen content suitable as feed to a natural gas liquids plant. Desirably, the process can provide for reboiling of the nitrogen from the methane and ethane-plus bottoms such that the nitrogen is at an acceptable level of less than about 3% for a natural gas liquids plant feed.

As a further advantage there is no need for an LNG (liquid natural gas) pump at the cold end since the methane product stream is removed as a vapor and not as a liquid from the low pressure distillation stage. A compressor is all that is needed for the methane product stream.

BRIEF DESCRIPTION OF THE DRAWINGS

The sole FIGURE is a simplified schematic flow diagram of an embodiment of the invention.

DETAILED DESCRIPTION OF THE INVENTION

The nitrogen rejection process of this invention is designed to produce a methane-rich gas for use as fuel or sales gas and a waste nitrogen stream vented to atmosphere or potentially reinjected into wells as part of a tertiary oil recovery scheme.

The invention provides a method for rejecting nitrogen from a natural gas stream containing variable amounts of methane, nitrogen, carbon dioxide and ethane-plus hydrocarbons which comprises (a) passing the natural gas stream through a cooling zone,
(b) introducing the cooled natural gas stream into the high pressure stage of a double distillation column comprising a high pressure stage and a low pressure stage,
(c) fractionally distilling the natural gas stream in the high pressure distillation stage to provide an overhead consisting essentially of nitrogen substantially free of methane and carbon dioxide, and a bottoms comprising carbon dioxide and ethane-plus hydrocarbons,
(d) withdrawing a liquid side stream consisting essentially of nitrogen and methane substantially free of carbon dioxide from an intermediate level of the high pressure stage, expanding it through a valve and introducing it into an intermediate level of the low pressure stage,
(e) condensing the nitrogen overhead from the high pressure stage by heat exchange with a methane cycle to provide nitrogen reflux for the high pressure stage and a nitrogen liquid stream, which methane cycle comprises
  (i) removing a vapor methane stream from the bottoms of the low pressure stage and warming it to ambient temperature,
  (ii) compressing the vapor methane stream and condensing at least a portion of the compressed methane stream against a waste nitrogen overhead stream from the low pressure stage,
  (iii) expanding the condensed methane stream through a valve and combining it with the methane bottoms of the low pressure stage to provide additional refrigeration to the methane bottoms,
  (iv) withdrawing a liquid methane stream from the bottoms of the low pressure stage, and
  (v) vaporizing the liquid methane stream against the nitrogen overhead of the high pressure stage to condense at least a portion of the overhead to provide the nitrogen reflux and to methane reboil to the low pressure stage,
(f) expanding the nitrogen liquid stream through a valve into the top of the low pressure stage, and
(g) fractionally distilling the nitrogen and methane in the low pressure stage to recover an overhead waste nitrogen vapor stream and a bottoms methane product stream.

The invention will now be described with reference to the FIGURE.

The natural gas feed stream in line 10 is initially treated in conventional dehydration and carbon dioxide removal steps to provide a dry feed stream containing carbon dioxide at a level which will not cause freeze-out on the surfaces of the process equipment. A natural gas stream containing about 5% nitrogen dictates a maximum carbon dioxide level of about 1% above which freeze-out would occur in the low pressure distillation stage while at 80% nitrogen the maximum carbon dioxide level is about 500 ppm.

The natural gas feed stream in line 10 at about 30 to 40 atm is cooled by being successively passed through heat exchangers 12, 14 and 16 before it is introduced into the high pressure fractional distillation column 18 at an intermediate level. Advantageously, heat content which is to be removed from the natural gas feed stream may be used to provide reboiling for the bottoms at 20 in fractional distillation column 18. After providing the reboiling duty, the feed stream enters separator 22 where vapor and condensate are separated. Condensate leaves separator 22 in line 24 for introduction into high pressure distillation column 18 while the vapor in line 26 passes through heat exchanger 16 for further cooling prior to entering distillation column 18.

The cooled natural gas stream is fractionally distilled at about 20 to 25 atm to provide a bottoms at about $-118°$ C. containing methane, substantially all the carbon dioxide in the feed stream, essentially all of the ethane-plus hydrocarbons and some quantity of dissolved nitrogen. The bottoms is withdrawn in line 28 and expanded through valve 30 to about 19 to 24 atm prior to passing through heat exchangers 14 and 12 where it is warmed to ambient temperature by the natural gas feed and methane cycle streams to provide, after being compressed at 32, a methane product stream 34.

An overhead consisting essentially of nitrogen and a minor amount of methane at about $-153°$ C. is withdrawn from high pressure distillation column 18 by line 36 and is passed through heat exchanger 38 acting as a reboiler/condenser where it is condensed against the bottoms of low pressure distillation column 40 which bottoms has been provided with an extra degree of refrigeration by a methane heat pump cycle described in more detail below. A portion of condensed nitrogen overhead stream from reboiler/condenser 38 affords nitrogen reflux in line 42 which is passed back into the top of high pressure distillation column 18 to wash the carbon dioxide out of the feed gas stream. The extra degree of refrigeration in the methane bottoms of low pressure column 40 provides an extra amount of nitrogen condensate in reboiler/condenser 38.

Since the extra nitrogen condensate returning as reflux permits a thorough scrubbing of the carbon dioxide from the feed stream, it is possible to withdraw a liquid stream containing essentially nitrogen and methane substantially free of carbon dioxide from an intermediate level of high pressure distillation column 18 by line 44 for further cooling through heat exchanger 46, expansion through valve 48 and introduction into an intermediate level of low pressure distillation column 40. A portion of the liquid nitrogen overhead from the high pressure distillation column is withdrawn from line 42 by line 50, further cooled in heat exchanger 52, and expanded through valve 54 to provide a vapor and liquid stream at about $-189°$ C. as reflux to the top of low pressure distillation column 40.

The nitrogen and methane from streams 44 and 50 are fractionally distilled in low pressure distillation column 40 operating at a pressure from about 1.8 to 2.0 atm to provide an overhead consisting essentially of nitrogen vapor and substantially no methane at a temperature of about $-190°$ C. and a bottoms comprising substantially pure methane at about $-154°$ C.

An overhead stream of substantially pure nitrogen is removed by line 56 from low pressure distillation column 40 as a waste nitrogen stream which is passed successively through heat exchangers 52, 46, 16, 14, and 12 to give up its refrigeration before being vented to the atmosphere at 58 or possibly recompressed for reinjection into oil wells.

Refrigeration for the nitrogen rejection process and particularly for the reflux of the high pressure distillation column 18 is provided by a methane heat pump cycle. A vapor stream comprising substantially pure methane and a small amount of nitrogen is removed by line 60 from the bottoms of fractional distillation column 40. This vapor stream provides refrigeration by successive passage through heat exchangers 46, 16, 14 and 12. The stream now at ambient temperature is compressed by methane compressor 62 to about 32 atm, passed through an after-cooler, not shown, and is returned by line 64 for cooling and condensing through heat exchangers 12, 14, 16 and 46 as methane recycle. A fraction of the compressed methane recycle stream prior to cooling is removed in line 65 and combined with stream 34 as the methane product. The condensed methane stream 64 at about $-157°$ C. is expanded through valve 66 into the bottoms of low pressure distillation column 40 to provide an extra degree of refrigeration to the methane bottoms.

A liquid stream of this methane bottoms containing an extra amount of refrigeration is removed by line 68 and passed through reboiler/condenser 38 in a heat exchange relationship with the nitrogen overhead from the high pressure distillation column 18. The extra refrigeration affords an extra amount of nitrogen condensate for return as reflux via line 42 to the high pressure distillation column. The methane stream leaves reboiler/condenser 38 as methane vapor in line 70 for reintroduction as reboil into the bottom of low pressure distillation column 40.

In an alternative embodiment the condensed methane stream 64 in the methane cycle after expansion through valve 66 may be directly added via a line 67 to the methane bottoms stream 68, thus closing the methane cycle through the methane streams 68 and 70.

In another embodiment, now shown, the vapor methane stream 60, which is compressed in the methane cycle, is obtained instead by withdrawing a portion of the vaporized methane stream 70 from the reboiler/condenser 38.

When the natural gas feed stream in line 10 comprises about 45% or more nitrogen, excess nitrogen vapor in line 36 from the overhead of the high pressure distillation column 18 is withdrawn by line 72, reheated through heat exchangers 16 and 14 against the methane recycle flow and then mechanically expanded through nitrogen expander 74 to supply additional refrigeration to the process. The expanded nitrogen stream in line 76 is passed from expander 74 into the waste nitrogen stream 56 for passage through heat exchangers 46, 16, 14 and 12 prior to venting to the atmosphere.

The following three examples disclose the operation of the above described nitrogen rejection process for processing a natural gas feed containing methane, carbon dioxide, ethane-plus hydrocarbons and nitrogen in varying amounts:

EXAMPLE 1

Natural gas having a composition of about 21% nitrogen, 62% methane, 107 ppm carbon dioxide and 17% ethane-plus materials is supplied as the feed stream. Table 1 shows the calculated heat and material balances corresponding to streams A through I as designated in the FIGURE.

TABLE 1

| STREAM | PHASE* | TEMP (°F.) | PRESS (psia) | TOTAL FLOW (lb mole/hr) | COMPONENT FLOW RATES (lb mole/hr) | | | |
|---|---|---|---|---|---|---|---|---|
| | | | | | NITROGEN | CARBON DIOXIDE | METHANE | ETHANE PLUS |
| A | V | 105.0 | 460.0 | 4091.2 | 869.1 | 0.44 | 2532.8 | 688.9 |
| B | L | −169.7 | 445. | 3669.0 | 643.2 | 0.43 | 2340.0 | 685.4 |
| C | V + L | −172.4 | 440 | 422.3 | 225.9 | 0.01 | 192.8 | 3.5 |
| D | V | 99.4 | 22.6 | 401.4 | 48.7 | 0.00 | 352.7 | 0.01 |
| E | V | 99.4 | 23.0 | 302.4 | 302.1 | 0.00 | 0.27 | 0.00 |
| F | V | 99.4 | 335 | 3742.9 | 561.4 | 0.44 | 2492.1 | 688.9 |
| G | L | −237.6 | 350. | 250.0 | 210.3 | 0.00 | 39.7 | 0.00 |
| H | V | −244.0 | 350 | 1405.2 | 1391.2 | 0.00 | 14.1 | 0.00 |
| I | V + L | −308.3 | 30.0 | 98.4 | 97.4 | 0.00 | 0.98 | 0.00 |

*V = Vapor
L = Liquid

EXAMPLE 2

In this example the feed gas comprises a natural gas having a composition of about 45% nitrogen, 43% methane, 107 ppm carbon dioxide and 12% ethane-plus materials. A stream of nitrogen overhead from the high pressure column is passed through the nitrogen expander 74 to provide refrigeration to handle the larger quantity of nitrogen in the feed gas stream. Tabulated in Table 2 are the calculated heat and material balances corresponding to streams A through J as designated in the FIGURE.

TABLE 2

| STREAM | PHASE* | TEMP (°F.) | PRESS (psia) | TOTAL FLOW (lb mole/hr) | COMPONENT FLOW RATES (lb mole/hr) | | | |
|---|---|---|---|---|---|---|---|---|
| | | | | | NITROGEN | CARBON DIOXIDE | METHANE | ETHANE PLUS |
| A | V | 105 | 460 | 4108.4 | 1855.0 | 0.44 | 1763.0 | 490.0 |
| B | L | −190.6 | 455 | 2577.9 | 748.6 | 0.41 | 1346.5 | 482.4 |
| C | V + L | −197.0 | 450 | 1530.5 | 1106.4 | 0.03 | 416.5 | 7.6 |
| D | V | 93.4 | 22.6 | 743.2 | 104.9 | 0.00 | 638.3 | 0.02 |
| E | V | 93.4 | 23.0 | 1463.1 | 1459.6 | 0.00 | 3.44 | 0.00 |
| F | V | 93.4 | 290 | 2484.4 | 372.7 | 0.44 | 1621.3 | 490 |
| G | L | −238.8 | 350 | 1000.0 | 864.5 | 0.00 | 135.5 | 0.00 |
| H | V | −244.0 | 350 | 3617.2 | 3581.0 | 0.00 | 36.2 | 0.00 |
| I | V + L | −308.4 | 30.0 | 374.1 | 370.3 | 0.00 | 3.74 | 0.00 |

TABLE 2-continued

| STREAM | PHASE* | TEMP (°F.) | PRESS (psia) | TOTAL FLOW (lb mole/hr) | COMPONENT FLOW RATES (lb mole/hr) | | | |
|---|---|---|---|---|---|---|---|---|
| | | | | | NITROGEN | CARBON DIOXIDE | METHANE | ETHANE PLUS |
| J | V | −271.6 | 27 | 250.0 | 247.5 | 0.00 | 2.50 | 0.00 |

*V = Vapor
L = Liquid

EXAMPLE 3

Natural gas which has a composition of about 76% nitrogen, 18% methane, 107 ppm carbon dioxide and 6% ethane-plus materials is the feed gas stream in this case. Again, the large quantity of nitrogen dictates withdrawing a nitrogen overhead stream from the low pressure distillation column for passage through the nitrogen expander. Table 3 shows the calculated heat and material balances corresponding to streams A through J designated in the FIGURE.

gen washdown in the high pressure column. Expansion of a methane stream in a low pressure methane heat pump cycle provides refrigeration for this increased condensing duty. Additional economy is also provided by the use of the nitrogen expansion turbine at higher nitrogen feed concentrations to provide additional refrigeration to the process.

STATEMENT OF INDUSTRIAL APPLICATION

The invention provides a process for rejecting nitrogen and recovering methane from a natural gas feed of

TABLE 3

| STREAM | PHASE* | TEMP (°F.) | PRESS (psia) | TOTAL FLOW (lb mole/hr) | COMPONENT FLOW RATES (lb mole/hr) | | | |
|---|---|---|---|---|---|---|---|---|
| | | | | | NITROGEN | CARBON DIOXIDE | METHANE | ETHANE PLUS |
| A | V | 105 | 460 | 4085.9 | 3085.6 | 0.44 | 754.0 | 245.9 |
| B | L | −210.7 | 437 | 584.2 | 125.2 | 0.31 | 223.8 | 234.9 |
| C | V + L | −216.6 | 435 | 3501.7 | 2960.4 | 0.13 | 530.2 | 11.0 |
| D | V | 89.5 | 24.6 | 650.3 | 115.5 | 0.00 | 534.7 | 0.00 |
| E | V | 89.5 | 22.0 | 2894.9 | 2888.3 | 0.00 | 6.66 | 0.00 |
| F | V | 89.5 | 300 | 1000.0 | 163.4 | 0.44 | 590.3 | 245.9 |
| G | L | −240.2 | 350 | 1400.0 | 1253.1 | 0.00 | 146.8 | 0.00 |
| H | V | −244.0 | 350 | 5110.1 | 5059.0 | 0.00 | 51.1 | 0.00 |
| I | V + L | −309.6 | 28.0 | 1185.9 | 1174.1 | 0.00 | 11.9 | 0.00 |
| J | V | −296.0 | 27.0 | 500.0 | 495.0 | 0.00 | 5.00 | 0.00 |

*V = Vapor
L = Liquid

The process of this invention provides nitrogen and methane feed streams of sufficiently low carbon dioxide content to the low pressure distillation column of a double distillation cycle by cryogenically fractionally distilling the feed natural gas in the high pressure distillation stage using an extra degree of nitrogen refluxing while maintaining a pressure in the high pressure fractional distillation column sufficiently high to dissolve the carbon dioxide in the bottoms comprising methane and the ethane-plus components. This increased refluxing supplies greater quantities of nitrogen condensate at cryogenic temperatures to more effectively wash, or scrub, the carbon dioxide from the feed gas stream and allows withdrawal of a nitrogen overhead and a nitrogen-methane side stream substantially free of carbon dioxide from the high pressure distillation column as feed streams for the nitrogen/methane separation step in the colder low pressure distillation column. Thus, freeze-out in the low pressure column is avoided. The degree of refrigeration required for this extra refluxing is most efficiently provided by a methane heat pump cycle since no other refrigeration source is sufficient to adequately effect this extra refluxing using as little energy. The high pressure distillation column is operated at sufficiently high pressure which allows warmer operating temperatures and, concomitantly, increased solubility of the carbon dioxide in the methane and ethane-plus bottoms.

In summary, the process of this invention provides the degree of nitrogen-methane separation normally available from a conventional double column cycle. Additionally, carbon dioxide which would freeze in the low pressure column is removed by increasing the nitrowidely varying nitrogen content which will allow the use of nitrogen injection/rejection tertiary oil recovery systems at existing well sites having natural gas liquids plant.

We claim:

1. In a cryogenic nitrogen rejection process for a natural gas feed stream comprising a double distillation cycle having a high pressure distillation stage and a low pressure distillation stage, the feed stream being introduced into the high pressure distillation stage wherein a nitrogen containing overhead and a hydrocarbon-containing bottoms are maintained while yielding a waste nitrogen overhead stream and a methane product bottoms stream from the low pressure distillation stage, the method for treating a natural gas feed stream containing variable amounts of methane, nitrogen, carbon dioxide and ethane-plus hydrocarbons which comprises
   (a) removing a vapor methane stream from the bottoms of the low pressure distillation stage and warming it to ambient temperature,
   (b) compressing the vapor methane stream and condensing at least a portion of the compressed methane stream against the waste nitrogen overhead stream from the low pressure distillation stage,
   (c) expanding the condensed methane stream through a valve and combining it with the methane bottoms of the low pressure distillation stage to provide additional refrigeration to the methane bottoms,
   (d) withdrawing a liquid methane stream possessing the additional refrigeration from the bottoms of the low pressure distillation stage, and
   (e) vaporizing the liquid methane stream against nitrogen overhead of the high pressure distillation stage to condense at least a portion of the nitrogen overhead to provide sufficient nitrogen reflux to the high pressure distillation stage for scrubbing substantially all of the carbon dioxide out of the feed stream in the high pressure distillation stage and keeping it soluble in the hydrocarbon bottoms, and methane reboil to the low pressure distillation stage.

2. The invention of claim 1 wherein the expanded methane stream of step (c) is introduced directly into the liquid methane stream of step (d) before the liquid methane stream is vaporized against the nitrogen overhead of the high pressure distillation stage.

3. The invention of claim 1 wherein the vapor methane stream of step (a) is withdrawn from the vaporized methane stream of step (e).

4. The invention of claim 1 wherein the nitrogen content of the natural gas feed stream varies from about 5 to about 80% and the corresponding maximum carbon dioxide content varies from about 1% to 500 ppm.

5. A method for rejecting nitrogen from a natural gas stream containing variable amounts of methane, nitrogen, carbon dioxide and ethane-plus hydrocarbons which comprises (a) passing the natural gas stream through a cooling zone, (b) introducing the cooled natural gas stream into the high pressure distillation stage of a double distillation cycle comprising a high pressure distillation stage and a low pressure distillation stage, (c) fractionally distilling the natural gas stream in the high pressure distillation stage at a pressure sufficient to provide an overhead consisting essentially of nitrogen substantially free of methane and carbon dioxide and a bottoms comprising substantially all of the carbon dioxide dissolved in the ethane-plus hydrocarbons, (d) withdrawing a liquid side stream consisting essentially of nitrogen and methane substantially free of carbon dioxide from an intermediate level of the high pressure distillation stage, expanding the side stream through a valve and introducing it into an intermediate level of the low pressure distillation stage, (e) condensing the nitrogen overhead from the high pressure distillation stage by heat exchange with a methane cycle to provide nitrogen reflux for the high pressure distillation stage and a nitrogen liquid stream, which methane cycle comprises (i) removing a vapor methane stream from the bottoms of the low pressure distillation stage and warming it, (ii) compressing the vapor methane stream and condensing at least a portion of the compressed methane stream against a waste nitrogen overhead stream from the low pressure distillation stage, (iii) expanding the condensed methane stream through a valve and combining it with the methane bottoms of the low pressure distillation stage to provide additional refrigeration to the methane bottoms, (iv) withdrawing a liquid methane stream possessing the additional refrigeration from the bottoms of the low pressure distillation stage, and (v) vaporizing the liquid methane stream against the nitrogen overhead of the high pressure distillation stage to condense at least a portion of the overhead to provide sufficient nitrogen reflux to the high pressure distillation stage for scrubbing the carbon dioxide out of the feed stream and methane reboil to the low pressure distillation stage, (f) expanding the nitrogen liquid stream through a valve into the top of the low pressure distillation stage, and (g) fractionally distilling the nitrogen and methane in the low pressure distillation stage to recover a waste nitrogen vapor overhead stream and a methane product bottoms stream.

6. The invention of claim 5 wherein the vapor methane stream from the bottoms of the low pressure stage is warmed to ambient temperature before being compressed.

7. The invention of claim 5 wherein the expanded methane stream of step (e)(iii) is introduced directly into the liquid methane stream of step (e)(iv) before the liquid methane stream is vaporized against the nitrogen overhead of the high pressure distillation stage.

8. The invention of claim 5 wherein the vapor methane stream of step (e)(i) is withdrawn from the vaporized methane stream of step (e)(v).

9. The invention of claim 5 which includes mechanically expanding a portion of the nitrogen overhead stream from the high pressure distillation stage when the nitrogen content of the natural gas stream is about 30 mole percent or greater.

10. The invention of claim 9 wherein the portion of the nitrogen overhead stream is mechanically expanded when the nitrogen content of the natural gas stream is at least about 45 mole percent.

11. The invention of claims 9 or 10 wherein refrigeration is recovered from the expanded nitrogen stream.

12. The invention of claim 11 wherein the expanded nitrogen stream is combined with the nitrogen overhead stream from the low pressure distillation stage.

13. The invention of claim 5 wherein the natural gas stream prior to entering the high pressure distillation stage is passed in a heat exchange relationship with the bottoms of the high pressure distillation stage to provide reboiling.

14. The invention of claim 5 wherein the high pressure distillation stage is operated at an overhead temperature of about $-153°$ C., a bottoms temperature of about $-118°$ C. and a pressure from about 20 to 25 atm.

15. The invention of claims 5 or 14 wherein the low pressure distillation stage is operated at an overhead temperature of about $-190°$ C., a bottoms temperature of about $-154°$ C. and a pressure from about 1.8 to 2.0 atm.

16. The invention of claim 5 wherein the natural gas stream introduced into the high pressure distillation stage has a maximum carbon dioxide content ranging from about 1% to 500 ppm corresponding to a nitrogen content ranging from about 5 mole percent to 80 mole percent.

17. The invention of claims 1 or 5 wherein the remainder of the compressed methane stream is removed as a methane product stream.

* * * * *